US011988018B2

(12) United States Patent
Farag et al.

(10) Patent No.: US 11,988,018 B2
(45) Date of Patent: *May 21, 2024

(54) REKEYABLE LOCK CYLINDER WITH ENHANCED TORQUE RESISTANCE

(71) Applicant: Spectrum Brands, Inc., Middleton, WI (US)

(72) Inventors: Hanna Farag, Riverside, CA (US); Jack Zhang, Xiamen (CN); Mark S. Bloom, Ladera Ranch, CA (US); James Lin, Laguna Niguel, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 570 days.

This patent is subject to a terminal disclaimer.

(21) Appl. No.: 16/825,817

(22) Filed: Mar. 20, 2020

(65) Prior Publication Data

US 2020/0318388 A1 Oct. 8, 2020

Related U.S. Application Data

(63) Continuation of application No. 15/172,206, filed on Jun. 3, 2016, now Pat. No. 10,612,271.

(60) Provisional application No. 62/180,339, filed on Jun. 16, 2015.

(51) Int. Cl.
*E05B 27/00* (2006.01)
*E05B 29/00* (2006.01)

(52) U.S. Cl.
CPC ........ *E05B 27/005* (2013.01); *E05B 27/0017* (2013.01); *E05B 27/0021* (2013.01); *E05B 27/0057* (2013.01); *E05B 27/0082* (2013.01); *E05B 29/004* (2013.01); *E05B 29/0066* (2013.01)

(58) Field of Classification Search
CPC ............. E05B 27/0082; E05B 27/0017; E05B 27/0057; E05B 27/005; E05B 29/004; E05B 29/0066; E05B 15/04; E05B 27/0021; Y10T 70/7616; Y10T 70/7621
USPC ........... 70/337–343, 368, 382–385, 492–496
See application file for complete search history.

(56) References Cited

U.S. PATENT DOCUMENTS

| | | | |
|---|---|---|---|
| 1,965,336 | A | 3/1934 | Fitz Gerald |
| 2,004,433 | A | 6/1935 | Fitz Gerald |
| 2,021,185 | A | 11/1935 | Hurd |

(Continued)

FOREIGN PATENT DOCUMENTS

| | | |
|---|---|---|
| CA | 2712501 | 7/2009 |
| JP | 2006-500495 | 1/2006 |

(Continued)

*Primary Examiner* — Christopher J Boswell
(74) *Attorney, Agent, or Firm* — Merchant & Gould P.C.

(57) ABSTRACT

A rekeyable lock cylinder with a cylinder body and a plug assembly. The lock cylinder includes a plurality of key followers and a corresponding plurality of racks disposed in the plug assembly. The lock cylinder includes, for example, a locking bar for blocking rotation of the plug assembly with respect to the cylinder body to prevent unlocking of the rekeyable lock cylinder with an unauthorized object. In some embodiments, the locking bar is configured such that torqueing the plug assembly with an unauthorized object applies force to the locking bar without translating such force to the plurality of racks. This type of arrangement enhances torque resistance of the lock cylinder against attempted forced entry.

19 Claims, 4 Drawing Sheets

(56) References Cited

U.S. PATENT DOCUMENTS

| | | | | | |
|---|---|---|---|---|---|
| 2,024,441 | A | | 12/1935 | Fitz Gerald | |
| 2,405,911 | A | | 8/1946 | Swanson | |
| 2,426,104 | A | | 8/1947 | Johnstone | |
| 2,460,551 | A | | 2/1949 | Swanson | |
| 2,879,658 | A | | 3/1959 | Johnstone | |
| 2,949,762 | A | | 8/1960 | Johnstone | |
| 3,080,744 | A | | 3/1963 | Spain | |
| 3,455,130 | A | | 7/1969 | Basseches | |
| 3,597,948 | A | | 8/1971 | Johnstone | |
| 3,709,006 | A | | 1/1973 | Seidewand | |
| 3,999,413 | A | * | 12/1976 | Raymond ............. | E05B 29/004 70/377 |
| 4,446,709 | A | | 5/1984 | Steinbach | |
| 4,485,648 | A | | 12/1984 | Rabinow | |
| 4,561,270 | A | | 12/1985 | Spreng | |
| 4,712,399 | A | * | 12/1987 | Mattossovich ....... | E05B 27/005 70/495 |
| 4,850,210 | A | | 7/1989 | Adler | |
| 4,966,021 | A | | 10/1990 | Boag | |
| 5,454,246 | A | | 10/1995 | Mueller | |
| 5,540,071 | A | | 7/1996 | Reikher | |
| 5,611,225 | A | | 3/1997 | Resch et al. | |
| 5,709,115 | A | | 1/1998 | Richter | |
| 5,819,566 | A | | 10/1998 | Eden, Jr. | |
| 5,956,986 | A | | 9/1999 | Vonlanthen | |
| 6,041,631 | A | | 3/2000 | Vonlanthen | |
| 6,523,381 | B1 | | 2/2003 | Ritz et al. | |
| 6,755,063 | B2 | * | 6/2004 | Takadama ........... | E05B 29/0066 70/495 |
| 6,860,131 | B2 | | 3/2005 | Armstrong et al. | |
| 6,862,909 | B2 | | 3/2005 | Armstrong et al. | |
| 6,871,520 | B2 | | 3/2005 | Armstrong et al. | |
| 6,951,123 | B2 | | 10/2005 | Chong et al. | |
| 6,959,569 | B2 | | 11/2005 | Strader et al. | |
| 7,007,528 | B2 | * | 3/2006 | Chong ................ | E05B 29/0073 70/495 |
| 7,100,408 | B2 | | 9/2006 | Nakasone | |
| 7,104,098 | B2 | | 9/2006 | Romero et al. | |
| 7,114,357 | B2 | | 10/2006 | Armstrong et al. | |
| 7,117,701 | B2 | | 10/2006 | Armstrong et al. | |
| 7,308,811 | B2 | | 12/2007 | Armstrong et al. | |
| 7,322,219 | B2 | | 1/2008 | Armstrong et al. | |
| 7,434,431 | B2 | | 10/2008 | Armstrong et al. | |
| 7,565,825 | B2 | | 7/2009 | Wheatland et al. | |
| 7,584,635 | B2 | | 9/2009 | Gan et al. | |
| 7,634,930 | B2 | | 12/2009 | Boesel et al. | |
| 7,634,931 | B2 | | 12/2009 | Segien et al. | |
| 7,878,036 | B2 | | 2/2011 | Armstrong et al. | |
| 7,900,491 | B2 | | 3/2011 | Chong | |
| 7,963,135 | B1 | * | 6/2011 | Tobias ................ | E05B 27/0039 70/494 |
| 8,033,150 | B2 | | 10/2011 | Armstrong | |
| 8,056,378 | B2 | * | 11/2011 | Huang .................. | E05B 29/004 70/495 |
| 8,099,988 | B1 | | 1/2012 | Wheatland | |
| 8,291,735 | B1 | | 10/2012 | Damikolas | |
| 8,316,676 | B2 | | 11/2012 | Chiang et al. | |
| 8,347,678 | B2 | | 1/2013 | Chong | |
| 8,408,080 | B2 | | 4/2013 | Damikolas | |
| 8,424,349 | B2 | | 4/2013 | Marcelle et al. | |
| 8,448,484 | B2 | | 5/2013 | Huang et al. | |
| 8,490,446 | B2 | | 7/2013 | Rao et al. | |
| 8,561,444 | B2 | * | 10/2013 | Loreti ................... | E05B 29/004 70/495 |
| 8,656,747 | B2 | | 2/2014 | Armstron et al. | |
| 8,661,863 | B2 | | 3/2014 | Loreti | |
| 8,739,587 | B2 | | 6/2014 | Chen | |
| 8,770,000 | B2 | | 7/2014 | Loreti | |
| 8,881,567 | B2 | | 11/2014 | Chong et al. | |
| 9,127,479 | B2 | | 9/2015 | Romero et al. | |
| 9,359,791 | B2 | | 6/2016 | Zhang | |
| 10,435,915 | B2 | * | 10/2019 | Zhang ................... | E05B 27/005 |
| 10,612,271 | B2 | * | 4/2020 | Farag .................. | E05B 27/0017 |
| 11,572,708 | B2 | * | 2/2023 | Farag .................. | E05B 27/0082 |
| 2003/0037582 | A1 | | 2/2003 | Edwards, Jr. et al. | |
| 2004/0060333 | A1 | | 4/2004 | Armstrong et al. | |
| 2004/0163433 | A1 | | 8/2004 | Armstrong et al. | |
| 2005/0193786 | A1 | | 9/2005 | Nakasone | |
| 2006/0032280 | A1 | | 2/2006 | Edwards, Jr. et al. | |
| 2006/0101880 | A1 | | 5/2006 | Ward-Dolkas et al. | |
| 2007/0089468 | A1 | | 4/2007 | Chong et al. | |
| 2008/0236224 | A1 | | 10/2008 | Chong | |
| 2008/0271505 | A1 | | 11/2008 | Armstrong et al. | |
| 2009/0277240 | A1 | | 11/2009 | Huang et al. | |
| 2010/0037666 | A1 | | 2/2010 | Chong | |
| 2010/0269602 | A1 | | 10/2010 | Damikolas | |
| 2011/0041579 | A1 | | 2/2011 | Chen | |
| 2012/0031156 | A1 | | 2/2012 | Wheatland | |
| 2012/0247163 | A1 | | 10/2012 | Damikolas | |
| 2013/0086957 | A1 | | 4/2013 | Emory | |
| 2013/0086958 | A1 | | 4/2013 | Emory | |
| 2014/0041429 | A1 | | 2/2014 | Zhang | |
| 2014/0069156 | A1 | | 3/2014 | Romero et al. | |
| 2016/0032618 | A1 | | 2/2016 | Field et al. | |

FOREIGN PATENT DOCUMENTS

| | | | |
|---|---|---|---|
| JP | 2008-519927 | | 6/2008 |
| JP | 2011074613 | A | 4/2011 |
| TW | 201331459 | | 8/2013 |
| WO | 2009008852 | A1 | 1/2009 |

* cited by examiner

REKEYABLE LOCK CYLINDER WITH ENHANCED TORQUE RESISTANCE

RELATED APPLICATIONS

This application is a continuation of U.S. application Ser. No. 15/172,206 filed Jun. 3, 2016, now U.S. Pat. No. 10,612,271; which claims the benefit of U.S. Provisional Application Ser. No. 62/180,339 filed Jun. 16, 2015, which applications are hereby incorporated by reference in their entireties.

TECHNICAL FIELD

This disclosure relates generally to locks; in particular, this disclosure relates to a lock with a rekeyable lock cylinder having enhanced torque resistance.

BACKGROUND AND SUMMARY

Lock cylinders that can be rekeyed without removal of the cylinder plug are known. For example, U.S. Pat. No. 8,033,150 describes a rekeyable lock cylinder. These types of locks are highly beneficial to consumers because the locks can be easily rekeyed without use of a locksmith.

Although the plug cylinder should freely rotate when an authorized key is inserted into the keyway, the lock cylinder should be configured to resist rotation of the plug when torque is applied by an unauthorized key (or other object). A high amount of torque resistance for the lock cylinder is key to reducing forced entry. Therefore, there is a need for a rekeyable lock with enhanced torque resistance.

According to one aspect, this disclosure provides a rekeyable lock cylinder with a cylinder body and a plug assembly. The cylinder body defines a longitudinal axis and includes a groove. The plug assembly is disposed in the cylinder body and is rotatable about the longitudinal axis. The lock cylinder includes a plurality of key followers and a corresponding plurality of racks disposed in the plug assembly. At least one of the plurality of racks is selectively disengageable from at least one of the plurality of key followers responsive to application of a force by an object inserted into the rekeyable lock cylinder to facilitate rekeying to a new key. The lock cylinder includes means for blocking rotation of the plug assembly with respect to the cylinder body to prevent unlocking of the rekeyable lock cylinder with an unauthorized object. In some embodiments, the blocking means is configured such that torqueing the plug assembly with an unauthorized object applies force to the blocking means without translating such force to the plurality of racks. This type of arrangement enhances torque resistance of the lock cylinder.

In some embodiments, the blocking means includes a locking bar movable transversely with respect to the longitudinal axis between a locked position into the groove of the cylinder body and an unlocked position out of the groove of the cylinder body. For example, the locking bar could include a surface that engages a surface of the groove when in the locked position. In some illustrative embodiments, the respective surfaces of the locking bar and groove that engage when the locking bar is in the locked position are in approximately parallel planes. Depending on the circumstances, the surface of the locking bar that engages the groove in the cylinder body when the locking bar is in the locked position is not a ramped surface. For example, the surfaces could be flat with respect to each other. In some cases, the edge of the locking bar is substantially squared off, such as having an approximately rectangular cross-section.

In some embodiments, there are one or more biasing members urging the locking bar towards the plurality of racks. With this arrangement, the biasing members urge the locking bar out of the groove in the cylinder body when an authorized key is inserted into the keyway. In some illustrative embodiments, a spring force of the biasing member is less than a spring force of the spring-loaded key followers. As such, the spring-loaded key followers will overcome the spring force of the biasing member to lock the lock cylinder when a key is not inserted into the keyway.

Additional features and advantages of the disclosure will become apparent to those skilled in the art upon consideration of the following detailed descriptions exemplifying the best mode of carrying out the disclosure as presently perceived.

BRIEF DESCRIPTION OF THE DRAWINGS

The present disclosure will be described hereafter with reference to the attached drawings which are given as non-limiting examples only, in which.

Corresponding reference characters indicate corresponding parts throughout the several views. The exemplification set out herein illustrates an embodiment of the invention in one form, and such exemplification is not to be construed as limiting the scope of the invention in any manner.

DETAILED DESCRIPTION

This disclosure relates to a rekeyable lock cylinder that can be rekeyed without removal of the cylinder plug. The operation for rekeying the lock cylinder is similar to that described in U.S. Pat. No. 8,033,150, which is hereby incorporated by reference. While the rekeying operation operates similarly, the present lock cylinder includes an enhanced torque resistance. In some embodiments, this enhanced torque resistance is configured in a manner that isolates torque on the plug cylinder from the racks, which increases durability of the lock cylinder.

Figure 1:
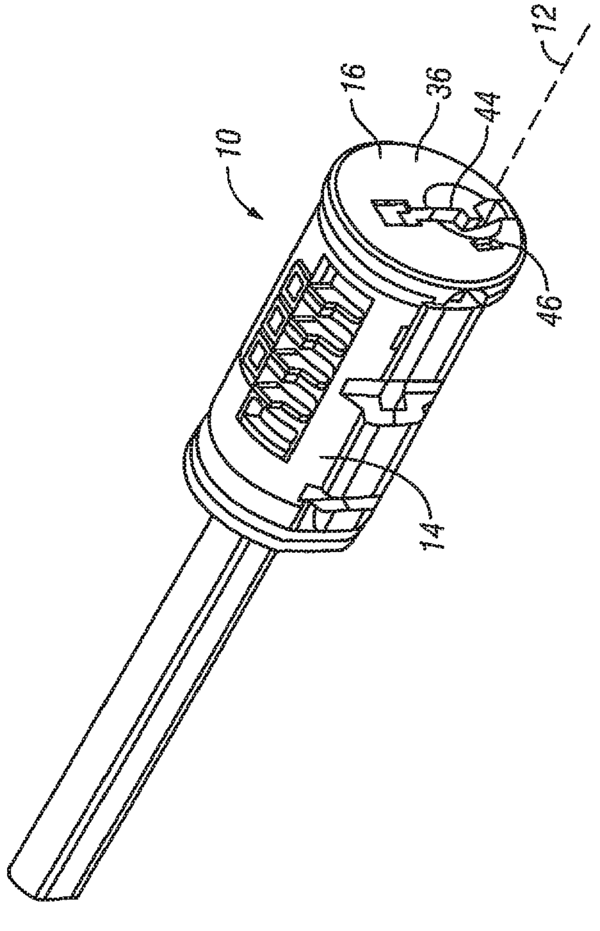
FIG. 1 is a perspective view of an example lock cylinder according to an embodiment of this disclosure.
Figure 2:
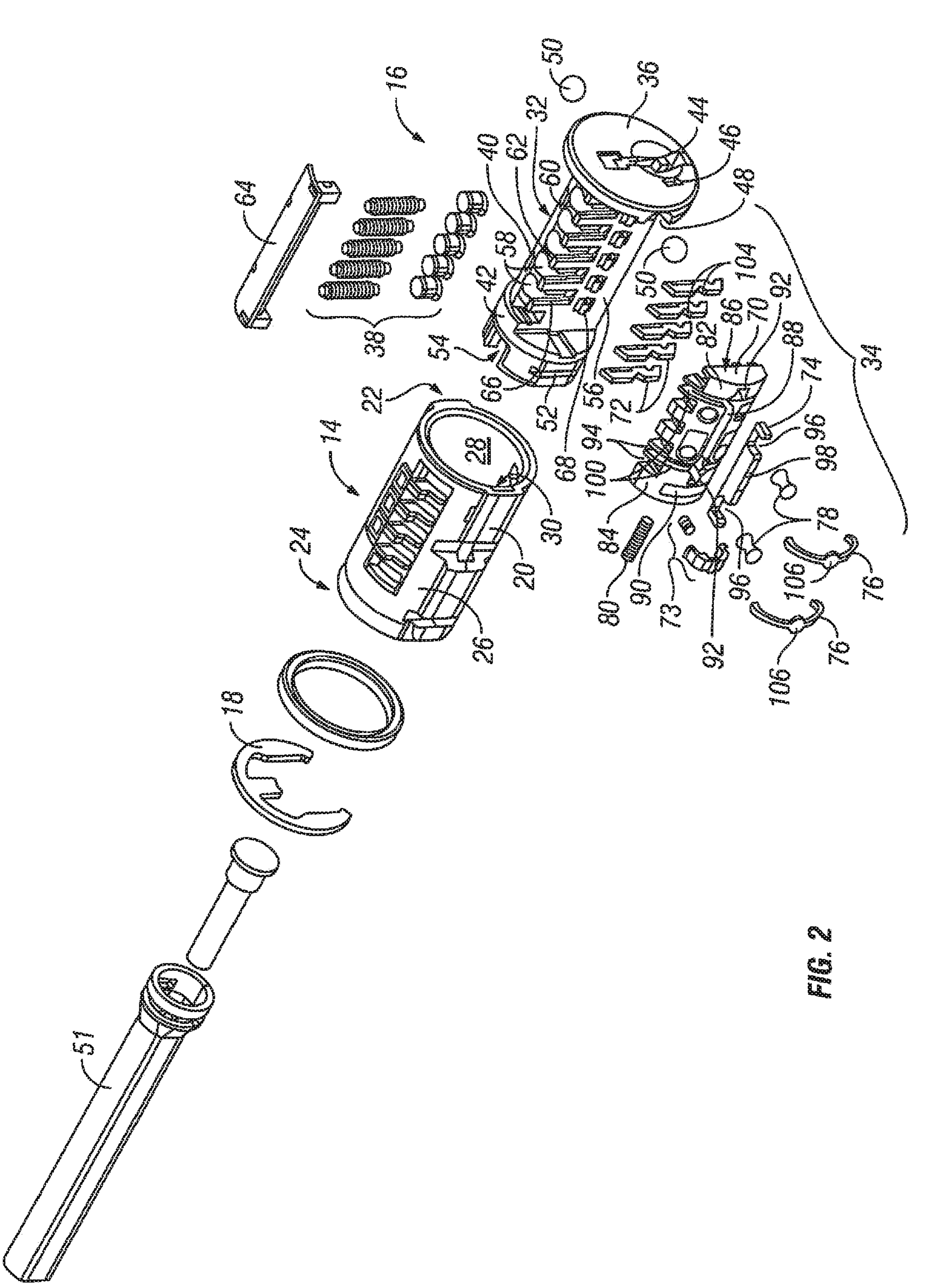
FIG. 2 is an exploded view of the example lock cylinder shown in FIG. 1.

An illustrative lock cylinder 10, according to an embodiment of the present disclosure, is illustrated in FIGS. 1 and 2. The lock cylinder 10 includes a longitudinal axis 12, a cylinder body 14, and a plug assembly 16. A retainer clip 18 (FIG. 2) couples together the cylinder body 14 with the plug assembly 16.

The cylinder body 14, as best seen in FIG. 2, illustratively includes a generally cylindrical body 20 having a front end 22, a back end 24 and a cylinder wall 26 defining an interior surface 28. The cylinder wall 26 includes an interior, locking bar-engaging groove 30 (best seen in FIGS. 4, 5, 6). In some embodiments, the locking bar-engaging groove 30 has a generally rectangular-shaped cross-section and extends longitudinally along a portion of the cylinder body 14, typically from the front end 22.

The plug assembly 16 includes a plug body 32, a carrier subassembly 34 and a plurality of spring-loaded pins 38 (also called key followers). The plug body 32 illustratively includes a plug face 36, an intermediate portion 40 and a drive portion 42. The plug face 36 defines a keyway opening 44, a rekeying tool opening 46, and a pair of channels 48 extending radially outwardly for receiving anti-drilling ball bearings 50. The drive portion 42 is configured to drive a torque blade 51, which could be coupled with a latch assembly (not shown). The drive portion 42 further includes a pair of slots 52 formed in its perimeter and a central groove 54 for receiving the retainer clip 18 to retain the plug body 32 in the cylinder body 14.

The intermediate portion 40 includes a main portion 56 formed as a cylinder section and having a plurality of channels 58 for receiving the spring-loaded pins 38. The channels 58 illustratively extend transversely to the longitudinal axis of the plug body 32.

A planar surface 60 defines a recess 62 for receiving a retaining cap 64. The channels 58 extend partially through the plug body 32, with the sidewalls of the channels open to a planar surface 66. The planar surface 66 illustratively includes a plurality of bullet-shaped, rack-engaging features 68.

The carrier subassembly 34 includes a carrier 70, a plurality of racks 72, a spring catch 73, a locking bar 74, a pair of clips 76 for holding corresponding biasing members 78 against the locking bar 74 to urge the locking bar 74 against the racks 72, and a return spring 80. The carrier 70 includes a body 82 in the form of a cylinder section that is complementary to the main portion 56 of the plug body 32, such that the carrier 70 and the main portion 56 combine to form a cylinder that fits inside the cylinder body 14. The carrier 70 includes a curved surface 84 and a flat surface 86. The curved surface 84 includes a locking bar slot 88, a spring catch recess 90, and a pair of clip receiving recesses 100 for receiving the clips 76. The locking bar slot 88 illustratively includes a pair of biasing member-receiving bores 92 for receiving the biasing members 78. In the embodiment shown, the locking bar 74 includes a corresponding pair of recessed areas 96 for receiving the biasing members 78.

Figure 4:
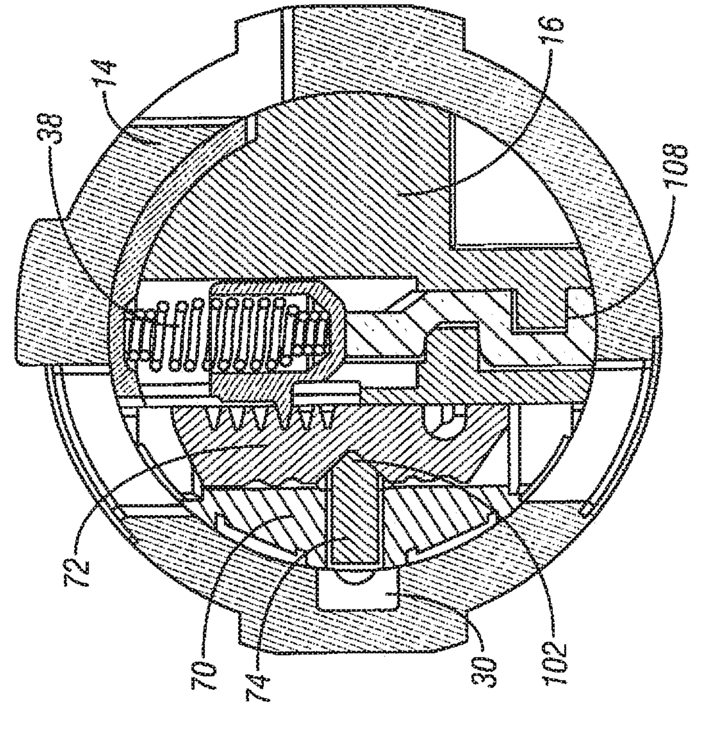
FIG. 4 is a cross-sectional view of the example lock cylinder shown in FIG. 1 showing the interface between the locking bar and cylinder body with an authorized key in the keyway.

The spring-loaded locking bar 74 is sized and configured to fit in the locking bar slot 88 in the carrier 70. The locking bar 74 illustratively includes a blocking portion 98 that is received in the locking bar engaging groove 30 in the cylinder body 14 when in the locked position (FIGS. 5 and 6) and extends out of the locking bar engaging groove 30 when in an unlocked position (FIG. 4). In some embodiments, as illustratively shown, the blocking portion 98 has a squared-off edge that forms a rectangular cross-section.

Figure 6:
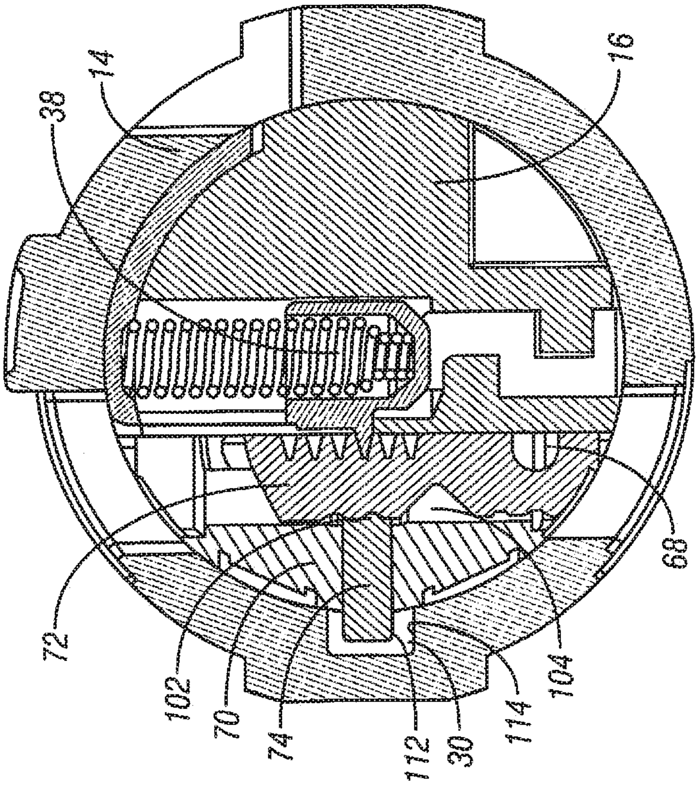
FIG. 6 is a cross-sectional view of the example lock cylinder shown in FIG. 1 showing the interface between the locking bar and cylinder body without a key in the keyway.
Figure 5:
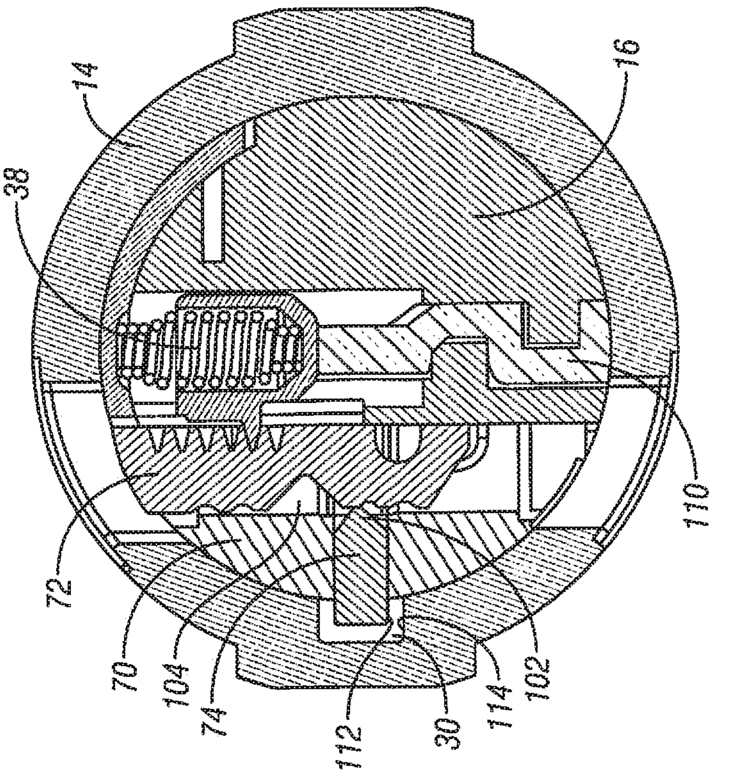
FIG. 5 is a cross-sectional view of the example lock cylinder shown in FIG. 1 showing the interface between the locking bar and cylinder body with an unauthorized key in the keyway.

This squared-off surface stands in contrast to the triangular-shaped edge of the locking bar described in U.S. Pat. No. 8,033,150, which moves out of the groove in the cylinder body via a camming action. By using the urging of biasing members 78 to move the blocking portion 98 out of the groove 30 in the cylinder body 14, a squared-off edge can be used with a corresponding flat surface in the locking bar engaging groove 30, thereby increasing torque resistance of the lock cylinder 10 compared to the triangular-shaped edge and corresponding triangular-shaped locking bar engaging groove described in U.S. Pat. No. 8,033,150. Moreover, this relieves stress on the racks 72 because torque applied by an unauthorized key (or other object) will not be translated from the locking bar 74 to the racks 72 via a camming action; instead, the locking bar 74 interface with the locking bar engaging groove 30 will isolate the torque from the racks 72. Opposite the squared-off edge of the blocking portion 98, the locking bar 74 includes a flange 102 configured to engage locking bar-engaging grooves 104 formed in the racks 72 (FIGS. 4, 5, 6). The flat surface 86 of the carrier 70 includes a plurality of parallel rack-receiving slots 94 extending perpendicular to the longitudinal axis of the carrier 70.

Figure 3:
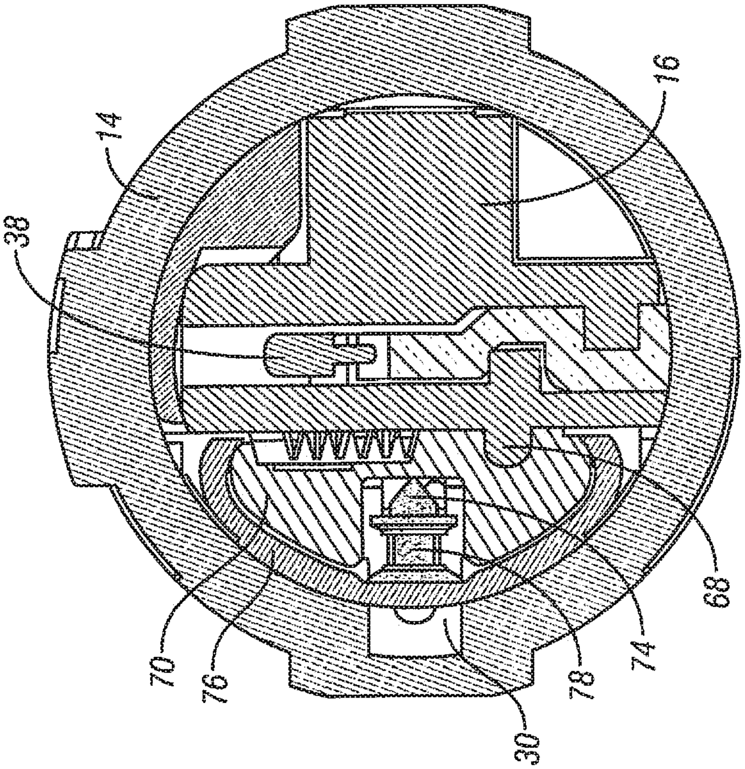
FIG. 3 is a cross-sectional view of the example lock cylinder shown in FIG. 1 showing the springs urging the locking bar towards the racks.

FIG. 3 is an illustrative cross-sectional view of the lock cylinder 10 transversely cut through one of the clips 76. In this view, it can be seen that the clips 76 extend around the carrier 70. One end of the biasing member 78 is fixed against a receiving portion 106 of the clip 76 and the other end is received in the recessed area 96 of the locking bar 74 and urges the locking bar 74 against the racks 72. In this embodiment, the locking bar 74 is continuously urged by the biasing members 78 against the racks 72.

FIGS. 4, 5, and 6 are illustrative cross-sectional views of the lock cylinder 10 transversely cut along the blocking portion 98 of the locking bar 74. In FIG. 4, which shows an authorized key 108 inserted into the keyway opening 44, the key cut of the authorized key 108 is such to move the spring-loaded pins 38 and thereby the racks 72 to a position in which the flange 102 of the locking bar 74 is received into the respective locking bar engaging grooves 104 of the racks 72 via the urging of the biasing members 78. This positions the blocking portion 98 of the locking bar 74 to its unlocking position out of the locking bar engaging groove 30, thereby allowing free rotation of the plug assembly 16 with respect to the cylinder body 14 to unlock the lock cylinder 10. This use of biasing members 78 to urge locking bar 74 out of locking bar engaging groove 30 stands in contrast to the camming action to move locking bar out of a groove in the cylinder body described in U.S. Pat. No. 8,033,150. FIG. 5 illustrates an example in which an unauthorized key 110 is inserted into the keyway opening 44. Since the key cut of the unauthorized key 110 is "unauthorized," the locking bar engaging groove 104 of at least one of the racks 72 is not aligned with the flange 102 of the locking bar 74. As such, the locking bar 104 cannot be urged out of the locking bar engaging groove 30 of the cylinder body 14, which means the blocking portion 98 prevents rotation of the plug assembly 16 with respect to the cylinder body 14. In the embodiment shown, the edge of the blocking portion 98 is squared-off and the locking bar engaging groove 30 of the cylinder body 14 has a corresponding shape. This means that the force caused by torqueing the plug assembly 16 with respect to the cylinder body 14 will be applied to a flat surface 112 of the blocking portion 98 with respect to a flat interior surface 114 of the locking bar engaging groove 30. Since the surfaces 112, 114 are flat with respect to each other, this enhances torque resistance compared to a ramped surface, such as the triangular edge of the locking bar and corresponding triangular groove in the cylinder body of U.S. Pat. No. 8,033,150. Moreover, unlike the flat surfaces 112, 114, the ramped surfaces described in U.S. Pat. No. 8,033,150 creates a camming action that applies force to the racks, which in some cases can deform the racks, or otherwise reduce durability of the racks. FIG. 6 illustrates an example in which there is no key in the lock cylinder 10. The springs of the spring-loaded pins 38 have a higher spring force than the biasing members 78. Accordingly, without a key in the keyway, the spring-loaded pins 38 drive the racks 72 downward, overcoming the force of biasing members 78, so that the flange 102 of the locking bar 74 is not received in the locking bar engaging grooves 104 of the racks 74. This forces the blocking portion 98 of the locking bar 74 into the locking bar engaging groove 30 of the cylinder body 14, which prevents rotation of the plug assembly 16 with respect to the cylinder body 14.

EXAMPLES

Illustrative examples of the rekeyable lock cylinder disclosed herein are provided below. An embodiment of the rekeyable lock cylinder may include any one or more, and any combination of, the examples described below.

Example 1 is a rekeyable lock cylinder with a cylinder body having a longitudinal axis and including a groove. The lock cylinder includes a plug assembly disposed in the cylinder body that is rotatable about the longitudinal axis. A plurality of key followers with a corresponding plurality of racks are disposed in the plug assembly. At least one of the plurality of racks is selectively disengageable from at least one of the plurality of key followers responsive to application of a force by an object inserted into the rekeyable lock cylinder to facilitate rekeying to a new key. The lock cylinder includes means for blocking rotation of the plug assembly with respect to the cylinder body to prevent unlocking of the rekeyable lock cylinder with an unauthorized object. The blocking means is configured such that force from torqueing the plug assembly with an unauthorized object is primarily distributed between the cylinder body and blocking means compared with any force translated to the plurality of racks, thereby enhancing torque resistance of the rekeyable lock cylinder.

In Example 2, the subject matter of Example 1 is further configured such that the blocking means comprises at least one locking bar movable transversely with respect to the longitudinal axis between a locked position into the groove of the cylinder body and an unlocked position out of the groove of the cylinder body.

In Example 3, the subject matter of Example 2 is further configured such that the at least one locking bar includes a surface that engages a surface of the groove when in the locked position. The respective surfaces of the at least one locking bar and groove engage when the at least one locking bar is in the locked position are in approximately parallel planes.

In Example 4, the subject matter of Example 3 is further configured such that the surface of the at least one locking bar that engages the groove in the cylinder body when the at least one locking bar is in the locked position is not a ramped surface.

In Example 5, the subject matter of Example 3 is further configured such that the surface of the at least one locking bar that engages the groove in the cylinder body when the at least one locking bar is in the locked position is a flat surface.

In Example 6, the subject matter of Example 3 is further configured such that the surface of the at least one locking bar that engages the groove in the cylinder body is in a plane that is approximately parallel to an axis radial to the longitudinal axis.

In Example 7, the subject matter of Example 2 is further configured such that an edge of the at least one locking bar is received in the groove of the cylinder body when in the locked position.

In Example 8, the subject matter of Example 7 is further configured such that the edge of the at least one locking bar is substantially squared off.

In Example 9, the subject matter of Example 7 is further configured such that the edge of the at least one locking bar has an approximately rectangular cross-section.

In Example 10, the subject matter of Example 1 is further configured to include a biasing member urging the blocking means towards the plurality of racks.

In Example 11, the subject matter of Example 10 is further configured such that the plurality of key followers are spring-loaded and wherein a spring force of the biasing member is proportional to a spring force of the spring-loaded key followers to ensure any key follower will not be lifted by the at least one locking bar.

Example 12 is a rekeyable lock cylinder including a cylinder body with a longitudinal axis including a groove. The lock cylinder includes a plug assembly disposed in the cylinder body and being rotatable about the longitudinal axis. A carrier assembly is provided that includes a plurality of racks and at least one locking bar. The lock cylinder includes a plurality of key followers disposed in the plug assembly. At least one of the plurality of racks is selectively disengageable from at least one of the plurality of key followers responsive to application of a force by an object inserted into the rekeyable lock cylinder to facilitate rekeying to a new key. The at least one locking bar is movable transverse to, and rotationally about the longitudinal axis. At least a portion of the at least one locking bar is movable between a locked position in the groove of the cylinder body and an unlocked position out of the groove in the cylinder body. The at least one locking bar is configured to prevent unlocking of the rekeyable lock cylinder with an unauthorized object. The at least one locking bar is configured such that force from torqueing the plug assembly with an unauthorized object is primarily distributed between the cylinder body and carrier assembly compared to any force translated to the plurality of racks.

In Example 13, the subject matter of Example 12 is further configured such that a biasing member urges the at least one locking bar towards the plurality of racks.

In Example 14, the subject matter of Example 12 is further configured such that the plurality of key followers are spring-loaded and a spring force of the biasing member is less than a spring force of the spring-loaded key followers.

Example 15 is a rekeyable lock cylinder that includes a cylinder body with a longitudinal axis including a groove. A plug assembly is disposed in the cylinder body and is rotatable about the longitudinal axis. The lock cylinder includes a plurality of key followers and a corresponding plurality of racks disposed in the plug assembly. At least one of the plurality of racks is selectively disengageable from at least one of the plurality of key followers responsive to application of a force by an object inserted into the rekeyable lock cylinder to facilitate rekeying to a new key. At least one locking bar is movable transverse to, and rotationally about the longitudinal axis. At least a portion of the at least one locking bar is movable between a locked position in the groove of the cylinder body and an unlocked position out of the groove in the cylinder body. The portion of the at least one locking bar is received into the groove has an approximately rectangular cross-section. The lock cylinder includes a biasing member that urges the at least one locking bar towards the plurality of racks.

In Example 16, the subject matter of Example 15 is further configured such that the plurality of key followers are spring-loaded and a spring force of the biasing member is less than a spring force of the spring-loaded key followers.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A rekeyable lock cylinder comprising:

a cylinder body with a longitudinal axis including a groove; and a plug assembly disposed in the cylinder body and being rotatable about the longitudinal axis, the plug assembly including;

a plurality of key followers, wherein at least one of the plurality of key followers includes at least one rack engaging feature at a first side, the at least one rack engaging feature being at least one of a projection and a recess;

a plurality of racks, wherein at least one of the plurality of racks includes a plurality of key follower engaging features at a first side, the plurality of key follower engaging features being a corresponding other one of the at least one of the projection and the recess of the at least one rack engaging feature;

wherein the at least one of the plurality of racks is selectively disengageable at the first side from the at least one of the plurality of key followers between a plurality of assignable key cut positions, the at least one of the plurality of racks also including a locking bar engaging groove at a second side, opposite the first side of the at least one of the plurality of racks; and a locking bar being movable between a locked position in the groove of the cylinder body and an unlocked position out of the groove of the cylinder body, wherein the locking bar is biased toward the plurality of racks, wherein the locking bar is positionable at least partially within the locking bar engaging groove when the at least one of the plurality of racks is positioned at both a first key cut position from an unauthorized key and a second key cut position from an authorized key, the first key cut position being consecutive with the second key cut position, wherein the first key cut position corresponds to the locked position of the locking bar, and wherein the second key cut position corresponds to the unlocked position of the locking bar.

2. The rekeyable lock cylinder of claim 1, wherein the at least one of the plurality of racks is selectively disengageable at the first side from the at least one of the plurality of key followers responsive to application of a force by an object inserted into the rekeyable lock cylinder to facilitate rekeying to a new key.

3. The rekeyable lock cylinder of claim 2, wherein the object is a rekeying tool.

4. The rekeyable lock cylinder of claim 1, wherein only the second key cut position corresponds with the unlocked position of the locking bar.

5. The rekeyable lock cylinder of claim 1, further comprising a biasing member urging the locking bar toward the plurality of racks.

6. The rekeyable lock cylinder of claim 1, wherein each consecutive assignable key cut position is separated by a key cut distance measured between centers of immediately adjacent key follower engaging features of the at least one of the plurality of racks, wherein the locking bar engaging groove has a bottom-most portion and two groove opening edges, wherein a height from the bottom-most portion to either of the groove opening edges, measured in a direction in which the at least one of the plurality of racks moves within a plug body, is greater than the key cut distance.

7. The rekeyable lock cylinder of claim 1, wherein an end of the locking bar that is positioned in the groove of the cylinder body when the locking bar is in the locked position has a rectangular cross-section.

8. The rekeyable lock cylinder of claim 1, wherein the locking bar is configured to prevent unlocking of the rekeyable lock cylinder with an unauthorized object, wherein the locking bar is configured such that force from torqueing the plug assembly with an unauthorized object is primarily distributed between the cylinder body and the locking bar as compared to any force translated to the plurality of racks without applying a force toward the longitudinal axis of the cylinder body.

9. The rekeyable lock cylinder of claim 1, wherein the locking bar includes a flange, the flange being defined by a pair of ramped surfaces extending toward one another from opposite sides of the locking bar, and wherein, when the locking bar is in the unlocked position, the ramped surfaces of the flange are positioned entirely within the locking bar engaging groove of the at least one of the plurality of racks.

10. A rekeyable lock cylinder comprising:

a cylinder body with a longitudinal axis including a groove; and a plug assembly disposed in the cylinder body and being rotatable about the longitudinal axis, the plug assembly including;

a plurality of key followers, wherein at least one of the plurality of key followers includes at least one rack engaging feature at a first side, the at least one rack engaging feature being at least one of a projection and a recess, the plurality of key followers being spring-loaded;

a plurality of racks, wherein at least one of the plurality of racks includes a plurality of key follower engaging features at a first side, the plurality of key follower engaging features being a corresponding other one of the at least one of the projection and the recess of the at least one rack engaging feature;

wherein the at least one of the plurality of racks is selectively disengageable at the first side from the at least one of the plurality of key followers between a plurality of assignable key cut positions, the at least one of the plurality of racks also including a locking bar engaging groove at a second side, opposite the first side of the at least one of the plurality of racks;

a locking bar being movable between a locked position in the groove of the cylinder body and an unlocked position out of the groove of the cylinder body, wherein the locking bar is positionable at least partially within the locking bar engaging groove when the at least one of the plurality of racks is positioned at both a first key cut position from an unauthorized key and a second key cut position from an authorized key, the first key cut position being consecutive with the second key cut position, wherein the first key cut position corresponds to the locked position of the locking bar, and wherein the second key cut position corresponds to the unlocked position of the locking bar; and a biasing member urging the locking bar towards the plurality of racks, wherein a spring force of the biasing member is less than a spring force of the plurality of spring-loaded key followers.

11. The rekeyable lock cylinder of claim 10, wherein, when no key is positioned within the lock cylinder, the plurality of key followers drive the plurality of racks downward, overcoming the spring force of the biasing member so that the locking bar is positioned out of the locking bar engaging groove.

12. The rekeyable lock cylinder of claim 10, wherein each consecutive assignable key cut position is separated by a key cut distance measured between centers of immediately adjacent key follower engaging features of the at least one of the plurality of racks, wherein the locking bar engaging groove has a bottom-most portion and two groove opening edges, wherein a height from the bottom-most portion to either of the groove opening edges, measured in a direction in which the at least one of the plurality of racks moves within a plug body, is greater than the key cut distance.

13. The rekeyable lock cylinder of claim 10, wherein an end of the locking bar that is positioned in the groove of the cylinder body when the locking bar is in the locked position has a rectangular cross-section.

14. A method of operating a lock cylinder comprising:

receiving a valid first key into a lock cylinder, the lock cylinder including:

a cylinder body with a longitudinal axis including a groove;

a plug assembly disposed in the cylinder body and being rotatable about the longitudinal axis, the plug assembly including;

a plurality of key followers, wherein at least one of the plurality of key followers includes at least one rack engaging feature at a first side, the at least one rack engaging feature being at least one of a projection and a recess;

a plurality of racks, wherein at least one of the plurality of racks includes a plurality of key follower engaging features at a first side, the plurality of key follower engaging features being a corresponding other one of the at least one of the projection and the recess of the at least one rack engaging feature;

wherein the at least one of the plurality of racks is selectively disengageable at the first side from the at least one of the plurality of key followers between a plurality of assignable key cut positions, the at least one of the plurality of racks also including a locking bar engaging groove at a second side, opposite the first side of the at least one of the plurality of racks; and a locking bar being movable between a locked position in the groove of the cylinder body and an unlocked position out of the groove of the cylinder body;

aligning the locking bar engaging groove of the at least one of the plurality of racks with the groove of the cylinder body, wherein when the valid first key is inserted at least partially into the plug assembly, the valid first key moves the at least one of the plurality of key followers, based on a first key cut configuration, so as to position the at least one of the plurality of racks at a first key cut position of the valid first key;

upon positioning the at least one of the plurality of racks at the first key cut position, automatically moving the locking bar into the locking bar engaging groove of the at least one of the plurality of racks and removing the locking bar from the groove of the cylinder body wherein the locking bar is automatically urged out of the groove of the cylinder body via a biasing member urging the locking bar toward the plurality of racks;

allowing rotation of the plug assembly with respect to the cylinder body from a home position to a first position;

receiving an invalid second key into the lock cylinder;

at least partially aligning the locking bar engaging groove of the at least one of the plurality of racks with the groove of the cylinder body, wherein when the invalid second key is inserted at least partially into the plug assembly, the invalid second key moves the at least one of the plurality of key followers, based on a second key cut configuration, so as to position the at least one of the plurality of racks at a second key cut position, the first key cut position consecutive with the second key cut position;

upon positioning the at least one of the plurality of racks at the second key cut position, automatically moving the locking bar at least partially into the locking bar engaging groove of the at least one of the plurality of racks and maintaining the locking bar at least partially in the groove of the cylinder body; and preventing rotation of the plug assembly with respect to the cylinder body from the home position to the first position.

15. The method of claim 14, wherein the first key cut position corresponds to an unlocked position of the locking bar and the second key cut position corresponds to a locked position of the locking bar.

16. The method of claim 14, wherein each consecutive assignable key cut position is separated by a key cut distance measured between centers of immediately adjacent key follower engaging features of the at least one of the plurality of racks, wherein the locking bar engaging groove has a bottom-most portion and two groove opening edges, wherein a height from the bottom-most portion to either of the groove opening edges, measured in a direction in which the at least one of the plurality of racks moves within a plug body, is greater than the key cut distance.

17. The method of claim 14, wherein a portion of the locking bar positionable in the groove of the cylinder body has a rectangular cross section.

18. The method of claim 14, wherein, when no key is received within the lock cylinder, the plurality of key followers drive the plurality of racks downward, overcoming a spring force of a biasing member urging the locking bar towards the plurality of racks so that the locking bar is positioned out of the locking bar engaging groove.

19. A rekeyable lock cylinder comprising:

a cylinder body with a longitudinal axis including a groove; and a plug assembly disposed in the cylinder body and being rotatable about the longitudinal axis, the plug assembly including;

a plurality of key followers, wherein at least one of the plurality of key followers includes at least one rack engaging feature at a first side, the at least one rack engaging feature being at least one of a projection and a recess;

a plurality of racks, wherein at least one of the plurality of racks includes a plurality of key follower engaging features at a first side, the plurality of key follower engaging features being a corresponding other one of the at least one of the projection and the recess of the at least one rack engaging feature;

wherein the at least one of the plurality of racks is selectively disengageable at the first side from the at least one of the plurality of key followers between a plurality of assignable key cut positions, the at least one of the plurality of racks also including a locking bar engaging groove at a second side, opposite the first side of the at least one of the plurality of racks; and a locking bar being movable between a locked position in the groove of the cylinder body and an unlocked position out of the groove of the cylinder body, wherein the locking bar is positionable at least partially within the locking bar engaging groove when the at least one of the plurality of racks is positioned at both a first key cut position from an unauthorized key and a second key cut position from an authorized key, the first key cut position being consecutive with the second key cut position, wherein the first key cut position corresponds to the locked position of the locking bar, and wherein the second key cut position corresponds to the unlocked position of the locking bar, wherein each consecutive assignable key cut position is separated by a key cut distance measured between centers of immediately adjacent key follower engaging features of the at least one of the plurality of racks, wherein the locking bar engaging groove has a bottom-most portion and two groove opening edges, wherein a height from the bottom-most portion to either of the groove opening edges, measured in a direction in which the at least one of the plurality of racks moves within a plug body, is greater than the key cut distance.

* * * * *